(12) United States Patent
Gu et al.

(10) Patent No.: US 11,679,528 B2
(45) Date of Patent: Jun. 20, 2023

(54) SOLID WASTE LARGE-MIXING-AMOUNT CONCRETE PREFABRICATED LAMINATED SLAB AND PREPARATION METHOD THEREOF

(71) Applicants: NORTHEASTERN UNIVERSITY, Shenyang (CN); CHINA NORTHEAST ARCHITECTURAL DESIGN & RESEARCH INSTITUTE CO., LTD., Shenyang (CN); CHINA CONSTRUCTION TECHNOLOGY GROUP CO., LTD., Beijing (CN); SHENYANG UNIVERSITY OF TECHNOLOGY, Shenyang (CN); CHINA WEST CONSTRUCTION BUILDING MATERIALS SCIENCE RESEARCH INSTITUTE CO., LTD., Chengdu (CN)

(72) Inventors: Xiaowei Gu, Shenyang (CN); Xinlong Zhang, Shenyang (CN); Hao Wang, Shenyang (CN); Yuxin Gao, Shenyang (CN); Xiaohui Li, Shenyang (CN); Weifeng Zhang, Shenyang (CN); Zhangmiao Li, Shenyang (CN); Jianping Liu, Shenyang (CN); Qingdong Liu, Shenyang (CN); Baokuan Ning, Shenyang (CN); Peng Liu, Shenyang (CN)

(73) Assignees: NORTHEASTERN UNIVERSITY; CHINA NORTHEAST ARCHITECTURAL DESIGN & RESEARCH INSTITUTE CO., LTD; CHINA CONSTRUCTION TECHNOLOGY GROUP CO., LTD; SHENYANG UNIVERSITY OF TECHNOLOGY; CHINA WEST CONSTRUCTION BUILDING MATERIALS SCIENCE RESEARCH INSTITUTE CO., LTD

( * ) Notice: Subject to any disclaimer, the term of this patent is extended or adjusted under 35 U.S.C. 154(b) by 0 days.

(21) Appl. No.: 17/574,102

(22) Filed: Jan. 12, 2022

(65) Prior Publication Data

US 2022/0234248 A1 Jul. 28, 2022

(30) Foreign Application Priority Data

Jan. 25, 2021 (CN) .......................... 202110096829.6

(51) Int. Cl.
*B28B 1/08* (2006.01)
*B28B 11/24* (2006.01)
(Continued)

(52) U.S. Cl.
CPC ................ *B28B 23/22* (2013.01); *B28B 1/08* (2013.01); *B28B 11/245* (2013.01); *B28B 13/06* (2013.01); *C04B 28/021* (2013.01)

(58) Field of Classification Search
CPC ......... B28B 23/22; B28B 1/08; B28B 11/245; B28B 13/06; B28B 1/045; B28B 23/005;
(Continued)

(56) References Cited

FOREIGN PATENT DOCUMENTS

CN 102850011 A 1/2013
CN 102850011 B * 1/2014
(Continued)

OTHER PUBLICATIONS

Machine English translation of CN-103572874-A (Year: 2014).*
(Continued)

*Primary Examiner* — Francisco W Tschen
*Assistant Examiner* — Edgaredmanuel Troche
(74) *Attorney, Agent, or Firm* — Katten Muchin; Rosenman LLP

(57) ABSTRACT

The present disclosure relates to the technical field of solid waste recycling and fabricated buildings, and provides a solid waste large-mixing-amount concrete prefabricated laminated slab and a preparation method thereof. The solid waste large-mixing-amount concrete prefabricated laminated slab provided by the present disclosure comprises a prefabricated layer and a laminated layer. Transverse grooves and longitudinal grooves are formed in the surface of the prefabricated layer. During application, the grooves can be used for erecting pipelines, the contact area of the prefabricated layer and the laminated layer can also be increased, the combined effect of new concrete and old concrete is improved, the integrity of a floor slab is enhanced, and the effect of improving the overall stress capacity of the floor slab is achieved.

9 Claims, 1 Drawing Sheet

(51) Int. Cl.
*B28B 13/06* (2006.01)
*C04B 28/02* (2006.01)
*B28B 23/22* (2006.01)

(58) Field of Classification Search
CPC ......... B28B 23/02; C04B 28/04; C04B 38/00; C04B 2111/00017; C04B 2111/40; C04B 2201/20; C04B 2201/50; E04C 2/06; E04C 2/46
See application file for complete search history.

(56) References Cited

FOREIGN PATENT DOCUMENTS

| | | | | | |
|---|---|---|---|---|---|
| CN | 103572874 | A | * | 2/2014 | |
| CN | 103572874 | A | | 2/2014 | |
| CN | 110005109 | A | | 7/2019 | |
| CN | 110668779 | A | * | 1/2020 | |
| CN | 110792239 | A | * | 2/2020 | ............. C04B 28/04 |
| CN | 111618976 | A | * | 9/2020 | ............... B28B 1/14 |
| CN | 111892312 | A | * | 11/2020 | |
| CN | 111892312 | A | | 11/2020 | |
| JP | 5459655 | B2 | * | 4/2014 | ............... C22B 1/00 |
| WO | WO-8600291 | A | * | 1/1986 | ........... C04B 22/062 |

OTHER PUBLICATIONS

Machine English translation of CN-111892312-A (Year: 2020).*
Machine English translation of Fu et al. (2020); CN 111618976 A (Cited on ISR) (Year: 2020).*
Machine English translation of Chen et al. (2020); CN-111892312-A (Cited on ISR) (Year: 2020).*
Machine English translation of Lu et al. (2014); CN-102850011-B (Cited on ISR) (Year: 2014).*
Machine English translation of Liu et al. (2019);CN-109592946-A (Year: 2019).*
Jiangshan Zhao et al., "An evaluation of iron ore tailings characteristics and iron ore tailings concrete properties"; Elsevier. Construction and Building Material, 286. (Year: 2020).*
Machine English translation of Hideaki et al.; (2014); JP-5459655-B2, (Year: 2014).*
Machine English Translation of Li et al. (CN-110668779-A); Retrieved from https://worldwide.espacenet.com/patent/search/family/069087920/publication/CN110668779A?q=pn%3DCN110668779A (Year: 2020).*
First Office Action dated Jul. 21, 2021, from Chinese Application No. 202110096829.6, 10 sheets.

\* cited by examiner

SOLID WASTE LARGE-MIXING-AMOUNT CONCRETE PREFABRICATED LAMINATED SLAB AND PREPARATION METHOD THEREOF

CROSS REFERENCE TO RELATED APPLICATION(S)

This patent application claims the benefit and priority of Chinese Patent Application No. 202110096829.6, filed on Jan. 25, 2021, the disclosure of which is incorporated by reference herein in its entirety as part of the present application.

TECHNICAL FIELD

The present disclosure relates to the technical field of solid waste recycling and fabricated buildings, in particular to a solid waste large-mixing-amount concrete prefabricated laminated slab and a preparation method thereof.

BACKGROUND ART

Over the years, Chinese gravel aggregates are mainly collected naturally, the phenomenon of disordered mining and excessive digging is outstanding, and the influence on the ecological environment is large. An existing assembled laminated slab is mainly prepared from natural gravel aggregate and cement as main raw materials. With era development, Chinese economy is turned into a high-quality development stage from a high-speed growth stage, and the sustainable development of green hills and clear waters is paid more attention to. Natural sand aggregate resources are in shortage increasingly, the price is continuously increased, after many years of exploitation, the natural sand resources are rapidly reduced, and natural sand in some areas is almost exhausted. A traditional production mode is low in technological content, large in resource consumption and not suitable for basic requirements of high-quality development of the building industry. Solid wastes such as slag and waste rocks are doped into cement as aggregates, so that the environmental protection pressure can be relieved, the wastes can be turned into wealth, and the resource utilization of the solid wastes is realized. However, in the prior art, the additive amount of the solid wastes in concrete is low (generally 20-30%), and the strength and the working performance of the concrete are reduced due to the fact that a large number of solid wastes is added.

In addition, a form of a prefabricated layer of 60 mm and a laminated layer of 70 mm is generally adopted for an existing fabricated laminated slab, equipment pipelines are laid in the laminated layer, but due to the fact that the pipelines are crossed and due to the influence of reinforcing bars on the top of the laminated layer slab, the problems that the pipe diameters of the equipment pipelines are not enough and the equipment pipelines cannot be laid frequently occur. In addition, the laminated layer needs to be cast on site on the prefabricated layer, in order to increase the bonding performance of new concrete and old concrete, galling treatment is usually adopted to increase the bonding performance of new concrete and old concrete, but new concrete and old concrete are different in stress performance, the bonding performance of the prefabricated layer and the bonding layer cannot be well improved through the method, and the bonding degree between the two layers is poor. Therefore, the overall stress capacity of the floor slab is poor.

SUMMARY

For this purpose, the present disclosure provides a solid waste large-mixing-amount concrete prefabricated laminated slab and a preparation method thereof. The prefabricated laminated slab provided by the present disclosure is prepared from solid waste large-mixing-amount concrete, a new absorption channel is provided for industrial solid waste, the environmental protection pressure is relieved, and transverse grooves and longitudinal grooves are formed in the prefabricated layer, so that the problem that pipelines of an existing laminated slab are difficult to erect can be solved, and the bonding strength of the prefabricated layer and the laminated layer can be improved.

In order to achieve the above purpose, the present disclosure provides the following technical scheme:

A solid waste large-mixing-amount concrete prefabricated laminated slab comprises a prefabricated layer and a laminated layer, a reinforcement cage is arranged in the prefabricated layer, a plurality of transverse grooves and a plurality of longitudinal grooves are formed in the surface of the single side of the prefabricated layer, and the laminated layer is formed by pouring on the surface, provided with the grooves, of the prefabricated layer; the prefabricated layer and the laminated layer are prepared from solid waste high-mixing-amount concrete; the solid waste large-mixing-amount concrete comprises the following raw materials: 350 to 400 kg/m$^3$ of cement, 35 to 43 kg/m$^3$ of fly ash, 30 to 40 kg/m$^3$ of activated iron tailings, 930 to 950 kg/m$^3$ of tailing waste rocks, 870 to 880 kg/m$^3$ of tailing fine sand, 155 to 170 kg/m$^3$ of water and 3 to 5 kg/m$^3$ of additives.

Preferably, the activated iron tailings are prepared through the following method that the iron tailings are sequentially subjected to mechanical activation and thermal activation, the time of mechanical activation is 1-1.5 hours, the temperature of thermal activation is 600-800° C., and the time of thermal activation is 20-30 min.

Preferably, the additives comprise the following components: a water reducing agent, cellulose ether and dextrin; and the mass of the cellulose ether is 0.1-0.2% of the mass of the water reducing agent, and the mass of the dextrin is 1-2% of the mass of the water reducing agent.

Preferably, the fly ash is first-grade fly ash; the tailing waste rocks are continuously graded by 5-25 mm; the fineness modulus of the tailing fine sand is 2.1-2.2; and the average particle diameter of the activated iron tailings is 10 μm or less.

Preferably, the notch widths of grooves in the transverse grooves and the longitudinal grooves are 40-60 mm, and the depths of the grooves are 10-15 mm.

Preferably, the thickness of the prefabricated layer is 60-70 mm, and the thickness of the laminated layer is 60-70 mm.

The present disclosure also provides a preparation method of a solid waste large-mixing-amount concrete prefabricated laminated slab in the scheme, comprising the following steps:

firstly, coating an interface agent in a mold, and then binding a reinforcement cage in the mold;

secondly, pouring solid waste large-mixing-amount concrete in the mold, vibrating the concrete, and then pressing transverse grooves and longitudinal grooves in a concrete pouring surface by using a notch mold;

thirdly, carrying out curing and demolding in sequence on concrete members with the grooves formed in the step (2) to obtain a prefabricated layer; and fourthly, during application, casting the laminated layer on the face, provided with the grooves, of the prefabricated layer in situ to obtain the solid waste large-mixing-amount concrete prefabricated laminated slab, wherein the concrete for pouring the laminated layer is solid waste high-mixing-amount concrete.

Preferably, the preparation method further comprises the step of installing embedded parts in the mold according to design requirements after the reinforcement cage is bound.

Preferably, the curing method is natural curing or steam curing.

Preferably, the preparation method further comprises the step of flushing a demolding prefabricated slab until the surface roughness of the prefabricated layer reaches more than 4 mm after demolding.

The present disclosure provides a solid waste large-mixing-amount concrete prefabricated laminated slab, comprising a prefabricated layer and a laminated layer, and a reinforcement cage being arranged in the prefabricated layer, wherein a plurality of transverse grooves and a plurality of longitudinal grooves are formed in the surface of the single side of the prefabricated layer, and the laminated layer is formed by pouring on the surface, provided with the grooves, of the prefabricated layer; and the prefabricated layer and the laminated layer are prepared from solid waste high-mixing-amount concrete. The prefabricated laminated slab provided by the present disclosure is prepared from solid waste large-mixing-amount concrete, efficient utilization of solid waste resources is realized, a new absorption channel is provided for industrial solid wastes, the environmental protection pressure is relieved, and the double-industry fusion of two industries, namely prefabricated buildings and solid waste recycling, in technology, management and industry chains is realized.

In the solid waste large-mixing-amount concrete used for preparing the prefabricated laminated slab, aggregates comprise fly ash, tailing waste rocks, activated iron tailings and tailing fine sand, all the coarse and fine aggregates in the concrete are replaced by the solid waste, specifically, the iron tailings are subjected to mechanical activation and thermal activation, the activity of the iron tailings is improved through activation, the activated iron tailings are applied to concrete as an admixture, so that the cement consumption can be reduced, the cost is saved, and meanwhile, the anti-permeability performance and the later compressive strength of the concrete can be improved further; the tailing waste rocks are subjected to continuous grading, and coarse aggregate is replaced; and the fineness modulus of the tailing fine sand is controlled to be 2.1-2.2, so that the fluidity, cohesiveness and water-retaining property of a concrete mixture can be improved. The mixing amount of the solid waste in the concrete reaches 77% or above, the compressive strength and other properties of the concrete can meet the requirements, and the concrete is suitable for preparation of laminated slabs.

In addition, the transverse grooves and the longitudinal grooves are formed in the surface of the prefabricated layer of the laminated slab, in the application process, equipment pipelines are preferentially laid in the grooves of the prefabricated slab, and even if pipeline intersection exists, arrangement of steel bars at the top of a floor slab of the laminated slab cannot be affected; and through the grooves in the prefabricated layer, the contact area of the prefabricated layer and the laminated layer can also be increased, the concrete in the grooves plays a role of a shear key, the combined effect of new concrete and old concrete is improved, the integrity of the floor slab is enhanced, and the purpose of improving the overall stress capacity of the floor slab is further achieved.

The present disclosure also provides a preparation method of the prefabricated laminated slab. The preparation method provided by the present disclosure is simple in steps and easy for industrial production.

Figure 1:
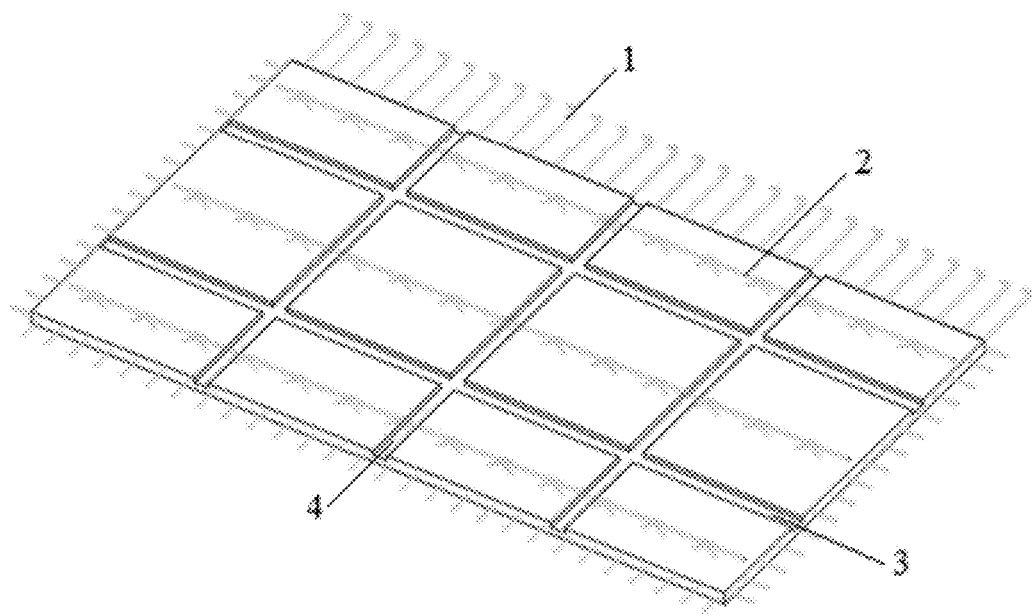
FIG. 1 is a structural schematic diagram of a prefabricated layer.
Figure 2:
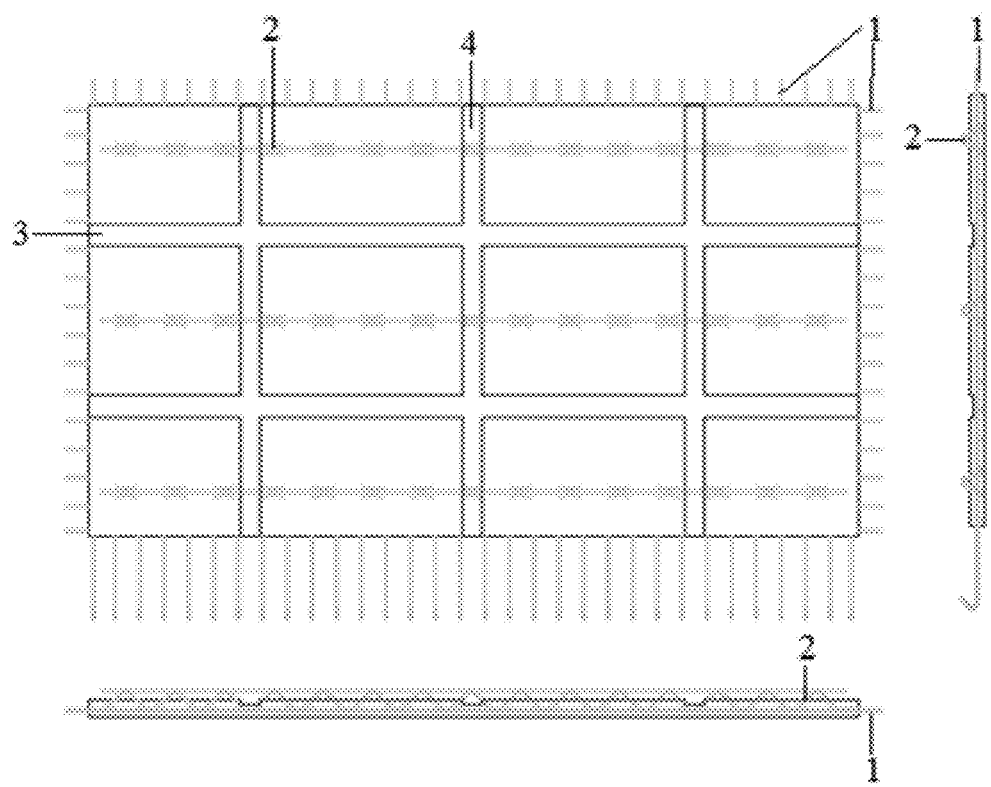
FIG. 2 is a three-view drawing of a prefabricated layer.

Reference signs in FIG. 1 and FIG. 2: 1, bottom board bar; 2, truss bar; 3, transverse groove; and 4, longitudinal groove.

DETAILED DESCRIPTION OF THE EMBODIMENTS

The present disclosure provides a solid waste large-mixing-amount concrete prefabricated laminated slab, comprising a prefabricated layer and a laminated layer, and a reinforcement cage being arranged in the prefabricated layer, wherein a plurality of transverse grooves and a plurality of longitudinal grooves are formed in the surface of the single side of the prefabricated layer, and the laminated layer is formed by pouring on the surface, provided with the grooves, of the prefabricated layer.

In the present disclosure, the prefabricated layer and the laminated layer are prepared from solid waste high-mixing-amount concrete; the solid waste large-mixing-amount concrete comprises the following raw materials: 350 to 400 kg/m$^3$ of cement, 35 to 43 kg/m$^3$ of fly ash, 30 to 40 kg/m$^3$ of activated iron tailings, 930 to 950 kg/m$^3$ of tailing waste rocks, 870 to 880 kg/m$^3$ of tailing fine sand, 155 to 170 kg/m$^3$ of water and 3 to 5 kg/m$^3$ of additives.

The solid waste large-mixing-amount concrete in the present disclosure comprises the following raw material: 350 to 400 kg/m$^3$, preferably 360 to 380 kg/m$^3$, of cement. There is no special requirement on the cement, and cement well known by those skilled in the art, such as ordinary Portland cement, is adopted.

The solid waste large-mixing-amount concrete in the present disclosure comprises the following raw material: 35 to 43 kg/m$^3$, preferably 38 to 40 kg/m$^3$, of fly ash. In the present disclosure, the fly ash is preferably first-grade fly ash.

The solid waste large-mixing-amount concrete in the present disclosure comprises the following raw material: 30 to 40 kg/m$^3$, preferably 32 to 38 kg/m$^3$, of activated iron tailings. In the present disclosure, the activated iron tailings are prepared through the following method that the iron tailings are sequentially subjected to mechanical activation and thermal activation, the time of mechanical activation is 1-1.5 hours, the temperature of thermal activation is 600-800° C., and the time of thermal activation is 20-30 min; and the average particle diameter of the activated iron tailings is preferably 10 μm or less, more preferably 1-10 μm.

The solid waste large-mixing-amount concrete in the present disclosure comprises the following raw material: 930 to 950 kg/m$^3$, preferably 935 to 945 kg/m$^3$, of tailing waste rocks. In the present disclosure, the tailing waste rocks specifically can be one or more of iron tailings, waste rocks, desulfurized ash or steel slag; in the present disclosure, the tailing waste rocks are continuously graded by 5-25 mm; in specific embodiments of the present disclosure, the tailing waste rocks stripped from strip mine are preferably subjected to refining pretreatment to obtain the tailing waste rocks with the satisfactory particle sizes. In the present disclosure, the refining pretreatment preferably comprises crushing and screening treatment in sequence, and the method has no special requirements on specific conditions of the crushing and screening treatment, so that the tailing waste rocks with the satisfactory particle sizes can be obtained. In the present disclosure, the particle size of the desulfurized fly ash is small, and the desulfurized fly ash can be directly used without refining pretreatment.

The solid waste large-mixing-amount concrete in the present disclosure comprises the following raw material: 870 to 880 kg/m$^3$, preferably 875 to 885 kg/m$^3$, of tailing fine sand. In the present disclosure, the fineness modulus of the tailing fine sand is preferably 2.1-2.2.

The solid waste large-mixing-amount concrete in the present disclosure comprises the following raw material: 155 to 170 kg/m$^3$, preferably 160 to 165 kg/m$^3$, of water. There is no special requirement for water, and water well known in the field, such as tap water, is used.

The solid waste large-mixing-amount concrete in the present disclosure comprises the following raw material: 3 to 5 kg/m$^3$, preferably 3.5 to 4.5 kg/m$^3$, of additives. In the present disclosure, the additives comprise the following components: a water reducing agent, cellulose ether and dextrin; there is no special requirement on the type of the water reducing agent, and the water reducing agent can be specifically a polycarboxylate water reducing agent; and the mass of the cellulose ether is 0.01-0.02%, more preferably 0.015%, of the mass of the water reducing agent, and the mass of the dextrin is 0.1-0.2%, more preferably 0.15%, of the mass of the water reducing agent. In the present disclosure, the water reducing agent has the effect of reducing the water consumption, the cellulose ether and the dextrin have the effects of water retention and thickening, and the water reducing agent, the cellulose ether and the dextrin are compounded, so that the obtained additives are suitable for the solid waste high-yield concrete disclosed by the present disclosure, and the working performance of the concrete can be greatly improved.

There is no special requirement on the preparation method of the solid waste high-mixing-amount concrete, and the components are uniformly mixed by adopting a well-known method in the field. According to the scheme, the concrete is used for preparing the prefabricated laminated slab, multi-scale channel consumption of bulk industrial solid wastes can be promoted, and double-production fusion of two industries, namely prefabricated buildings and solid waste recycling, in technology, management and industrial chains is achieved.

The solid waste large-mixing-amount concrete prefabricated laminated slab provided by the present disclosure comprises a prefabricated layer and a laminated layer, and a reinforcement cage is arranged in the prefabricated layer. In the present disclosure, a plurality of transverse grooves and a plurality of longitudinal grooves are formed in the surface of the single side of the prefabricated layer, the notch widths of grooves in the transverse grooves and the longitudinal grooves are preferably 40-60 mm, more preferably 50 mm, and the depths of the grooves are preferably 10-15 mm, more preferably 13-15 mm; and the distance between every two adjacent transverse grooves is preferably ⅓ of the longitudinal span of the prefabricated layer, and the distance between every two adjacent longitudinal grooves is preferably ¼ of the transverse span of the prefabricated layer. There is no special requirement on the number of the transverse grooves and the number of the longitudinal grooves in the prefabricated slab, and the transverse grooves and the longitudinal grooves are arranged according to the distance between the adjacent grooves and the area of the prefabricated slab. The transverse grooves and the longitudinal grooves are formed in the surface of the prefabricated layer, the grooves can be used for erecting equipment pipelines during application, the problem that pipelines are difficult to erect in the prior art is solved, the contact area of the prefabricated layer and the laminated layer can be increased due to the existence of the grooves, and the combined effect of new concrete and old concrete is improved.

In the present disclosure, the reinforcement cage is arranged in the prefabricated layer, and there is no special requirement on the arrangement method of the reinforcement cage, and the reinforcement cage can be arranged by adopting a method well known by those skilled in the art; and in the specific embodiments of the present disclosure, the reinforcement cage comprises bottom board bars and truss bars.

In the present disclosure, the thickness of the prefabricated layer is preferably 60-70 mm. In the specific embodiments of the present disclosure, embedded parts are further preferably arranged in the prefabricated layer, there is no special requirement on the embedded parts, and the number, specification and position of the embedded parts are set according to the design requirements of a drawing; the embedded parts are specifically components needing to be installed in advance, such as an electric box.

FIG. 1 is a structural schematic diagram of a prefabricated layer; and FIG. 2 is a three-view drawing of a prefabricated layer. Reference signs in FIG. 1 and FIG. 2: 1, bottom board bar; 2, truss bar; 3, transverse groove; and 4, longitudinal groove.

In the present disclosure, the laminated layer is formed by pouring on the surface, provided with the grooves, of the prefabricated layer, and the concrete for pouring is the solid waste high-mixing-amount concrete in the scheme. In the specific embodiments of the present disclosure, preferably, the erection of equipment pipelines is completed in the grooves of the prefabricated layer, and then the on-site pouring of the laminated layer is carried out. There is no special requirement on the pouring method of the laminated layer, and the method well known by those skilled in the art is adopted. In the present disclosure, the thickness of the laminated layer is preferably 60-70 mm.

The present disclosure also provides a preparation method of a solid waste large-mixing-amount concrete prefabricated laminated slab in the scheme, comprising the following steps:

firstly, coating an interface agent in a mold, and then binding a reinforcement cage in the mold;

secondly, pouring solid waste large-mixing-amount concrete in the mold, vibrating the concrete, and then pressing transverse grooves and longitudinal grooves in a concrete pouring surface by using a notch mold;

thirdly, carrying out curing and demolding in sequence on concrete members with the grooves formed in the step (2) to obtain a prefabricated layer; and fourthly, during application, casting the laminated layer on the face, provided with the grooves, of the prefabricated layer in situ to obtain the solid waste large-mixing-amount concrete prefabricated laminated slab, wherein the concrete for pouring the laminated layer is solid waste high-mixing-amount concrete in the scheme.

The interface agent is coated in the mold, and then a reinforcement cage is bond in the mold. There is no special requirement on the mold, the mold well known by those skilled in the art is adopted, and the shape of the mold is determined according to the shape of the target laminated slab.

In the specific embodiments of the present disclosure, the mold is repeatedly used, preferably, a mold plate which is detached after the last use is completed is cleaned and coated with a release agent, then the mold is obtained by assembling according to the size of the laminated slab, and then the steps of coating the interface agent and binding the reinforcement cage are carried out. In the specific embodiments of the present disclosure, the cleaning process needs to pay attention to the following items: a) residual concrete and other sundries in the inner cavity of the mold are firstly cleaned by using a steel wire ball or a scraper blade until no floating ash exists when the inner cavity of the mold is wiped by hands; b) all mold splicing parts are cleaned by using the scraper blade, so that no residual concrete is ensured, and no size deviation is ensured during mold assembling; c) the upper edge and the lower edge of a reference surface of a component side plate must be cleaned, and the thickness requirement is guaranteed during plastering; d) tools on the outer side of the mold plate and the mold are completely cleaned without residual concrete; and e) there is no concrete residue on the surface of the mold. The process of brushing the release agent on the surface of the cleaned mold needs to pay attention to the following items: a) before brushing, it is guaranteed that the mold plate must be clean and free of floating ash, before binding of the reinforcement cage, brushing of the release agent on the reinforcement cage is strictly forbidden; b) a brushing tool is a brush, brushing must be uniform, flowing and accumulation phenomena are strictly forbidden, and the brushing surface of the brushed side mold is required to be horizontally placed upwards; and c) 30 minutes later, assembling can be carried out after the surface of the release agent is naturally dried. When the mold plate is assembled, the side molds of the component are assembled on the bottom mold according to the drawing size of the corresponding component, the side molds are connected through fastening devices such as bolts, pins and magnetic boxes, and the integrity of the component mold is guaranteed.

After the assembled mold is obtained, the interface agent is coated in the mold, and then the reinforcement cage is bond in the mold. Considerations for coating the interface agent are consistent with those described above and are not repeated here. There is no special requirement on the interface agent, and the interface agent well known to those skilled in the art is used. There is no special requirement on the binding method of the reinforcement cage, binding is carried out according to a method well known by those skilled in the art, and the size of the reinforcement is carefully checked before the reinforcement cage is bound.

Preferably, the embedded parts are installed in the mold according to design requirements after the reinforcement cage is bound. In the specific embodiments of the present disclosure, preferably, auxiliary tools such as a tool and a magnetic base are utilized to guarantee the installation position and precision of the embedded parts, the number and specification positions of the embedded parts are set according to the design requirements of the drawing, the anchoring depth and perpendicularity of the embedded parts are guaranteed, and upper openings of the embedded parts need to be sealed tightly to avoid slurry feeding.

After the embedded parts are installed, the solid waste large-mixing-amount concrete in the scheme is poured into the mold and vibrated. In the present disclosure, the concrete pouring process needs to pay attention to the following items: a) the concrete pouring should be uniform and continuous, and the feeding height is not more than 500 mm; b) it should be ensured that the mold and the embedded parts do not deform or displace during concrete pouring, and measures are taken to correct the deviation in time if the deviation exists; c) the time from discharging of the concrete to pouring is not more than 40 min; and d) in hot summer, the mold entering temperature of the concrete mixture should not be higher than 35° C., and during winter construction, the mold entering temperature of the concrete mixture should not be lower than 5° C.

In the present disclosure, the vibration is preferably mechanical vibration, and the insertion distance of vibration rods for mechanical vibration is preferably not more than one time of the vibration action radius of the vibration rods; the vibration time is preferably 10-30 s, in the specific embodiments of the present disclosure, the vibration time is preferably controlled according to the consistency of the concrete mixture and the vibration part, and when flooding appears on the surface of the concrete mixture and basically no bubbles overflow, the concrete mixture can be regarded to be tamped. In addition, water is strictly forbidden to be added to the concrete mixture in the transportation and casting forming process.

After vibration is completed, the transverse grooves and the longitudinal grooves are pressed in the concrete pouring surface by using the notch mold. In the present disclosure, the size of the notch mold is preferably set according to the size of the groove, there is no special requirement on the groove pressing process, and the transverse grooves and the longitudinal grooves with the satisfactory sizes can be obtained.

After groove pressing, curing and demolding are carried out in sequence on concrete members with the grooves to obtain a prefabricated layer. In the present disclosure, the curing method is preferably natural curing or steam curing; the natural curing is preferably watering curing or chemical protection film curing; the covering for watering curing is specifically a straw mat, a reed mat, a jute bag, sawdust and the like; and a chemical protection film used for chemical protection film curing is preferably a plastic film.

In the present disclosure, the steam curing preferably comprises a standing stage, a heating stage, a constant temperature stage and a cooling stage which are carried out in sequence; the time of the static stopping stage is preferably 3 hours, and the static stopping stage preferably adopts a film covering or humidifying measure to prevent the component from being dried; the heating rate of the heating stage is preferably 10-20° C./h, more preferably 13-15° C./h, and the terminal temperature of the heating stage is preferably 60° C.; in the constant temperature stage, constant temperature is maintained at 60° C., and the time of the constant temperature stage is preferably more than 4 hours, more preferably 4-6 hours; the cooling rate of the cooling stage is preferably less than or equal to 10° C./h, and cooling is carried out specifically to the environment temperature.

In the present disclosure, when the strength of the concrete is cured to be greater than or equal to 20 MPa, the curing measures can be removed, and demolding is carried out.

After curing is completed, the obtained concrete members are demolded. In the present disclosure, when the concrete members are demolded and hoisted, the required compressive strength of a concrete standard cube is determined according to design requirements or specific production conditions, and the following requirements are met: a)

curing is carried out until the strength of the concrete is not less than 20 MPa, curing measures can be removed, and the mold is dismounted; b) the mold is dismounted when the difference between the surface temperature of the concrete and the external temperature is not more than 20° C. for construction of the concrete in winter; c) component damage caused by violent mold dismounting is forbidden in the mold dismounting process; d) during demolding, careful checking is carried out to confirm that the connecting part between the component and the mould is completely dismantled and then lifting is carried out; and e) the number of hoisting points should be met during component hoisting, simultaneous stress and stable hoisting of all the hoisting points are guaranteed, and special components should be hoisted by adopting a special hoisting tool.

After demoulding is completed, preferably, the obtained prefabricated layer is flushed until the surface roughness of the prefabricated layer reaches more than 4 mm; the surface roughness of the prefabricated layer is increased through flushing, so that the prefabricated layer and the laminated layer can be better bonded, the integrity of the laminated slab is improved, and the stress capacity of the laminated slab is improved.

After flushing is completed, components of the prefabricated layer are preferably marked, repaired and stored. There is no special requirement on marking, repairing (repairing is needed if damage, cracks and other problems are caused after demolding) and storage, the method is well known by those skilled in the art, and in the storage process, the prefabricated layer is preferably subjected to film covering protection.

In the present disclosure, the measured compressive strength of the prefabricated layer at the factory date is preferably greater than or equal to 30 MPa.

During application, the laminated layer is cast on the surface, provided with the grooves, of the prefabricated layer in situ to obtain the laminated slab; and the concrete for pouring the laminated layer is the solid waste high-mixing-amount concrete in the scheme. Specifically, in the construction process, preferably, pipeline erection is conducted in the grooves of the prefabricated layer firstly, then the laminated layer is cast on site, there is no special requirement on the method for casting the laminated layer on site, and the method well known by those skilled in the art is used.

In combination with the embodiments in the present disclosure, the technical scheme in the disclosure is described clearly and completely.

Embodiment I

The solid waste large-mixing-amount concrete is prepared from the following raw materials: 370 kg/m³ of cement, 41 kg/m³ of first-grade fly ash, 950 kg/m³ of tailing waste rocks, 20 kg/m³ of activated iron tailings, 870 kg/m³ of tailing fine sand, 165 kg/m³ of water and additives (comprising 4 kg/m³ of polycarboxylate water reducing agent, 0.15% of cellulose ether and 1.5% of dextrin by mass of polycarboxylate water reducing agent).

Wherein, the tailing waste rocks are continuously graded by 5-20 mm, the cement is P.O42.5 ordinary Portland cement, the fineness modulus of the tailing fine sand is 2.1-2.2, and the average particle size of the activated iron tailings is less than 10 μm.

The above components are blended to obtain concrete, the concrete is naturally cured, the properties of concrete are tested, and the results are as shown in Table 1:

TABLE 1 performance test results of solid waste large-mixing-amount concrete

| Projects | Compressive strength/MPa | | | Anti-permeability grade |
|---|---|---|---|---|
| | 3 d | 7 d | 28 d | |
| Test results | 23 | 35 | 42 | P8 |

Embodiment II

The solid waste large-mixing-amount concrete in the first embodiment is adopted for preparing the laminated slab, the laminated slab comprises a prefabricated layer and a laminated layer, the thickness of the prefabricated layer is 60 mm, the thickness of the laminated layer is 60 mm, transverse grooves and longitudinal grooves are formed in the surface of the prefabricated layer, the widths of notches of the transverse grooves and the longitudinal grooves are 50 mm, and the depths of the notches of the transverse grooves and the longitudinal grooves are 15 mm. The distance between every two adjacent transverse grooves is ⅓ of the span of the prefabricated layer, and the distance between every two adjacent longitudinal grooves is ¼ of the span of the prefabricated layer.

A preparation method specifically comprises the following preparation steps:

firstly, cleaning a mold plate, brushing a release agent, carrying out assembling according to the size of the laminated slab to obtain a mold, brushing an interface agent on the surface of the mold, binding a reinforcement cage, and then mounting embedded parts according to the design requirement of a drawing;

secondly, pouring the concrete in the first embodiment into the mold, then carrying out mechanical vibration for 30 s, enabling the distance between the vibration rods to be one time of the vibration action radius of the vibration rods, and carrying out vibration until the surface of the concrete mixture is flooded and bubbles do not overflow, and regarding the concrete mixture to be tamped;

thirdly, after the concrete is tamped, pressing transverse grooves and longitudinal grooves in the upper surface of the concrete layer through a notch mold;

fourthly, carrying out natural curing on concrete members with the grooves, wherein the curing mode is plastic film covering curing; curing the concrete until the compressive strength of the concrete reaches 20 MPa or above;

fifthly, demolding the cured concrete members, and flushing the demolded members until the surface roughness is 4 mm to obtain the prefabricated layer; and sixthly, the strength of the prefabricated layer is 30 MPa or above when the prefabricated layer leaves the factory, in the application process, pipelines are erected in the grooves of the prefabricated layer, then the laminated layer is cast on site, concrete for casting is concrete in the first embodiment, the laminated layer obtained after casting is naturally cured for 28 days, and the laminated slab is obtained.

The bonding surface of the obtained laminated slab is high in bonding capacity and good in integrity.

Embodiment III

Other conditions are consistent with that in the second embodiment, and only the raw materials of the concrete are changed: 380 kg/m³ of cement, 40 kg/m³ of first-grade fly ash, 940 kg/m³ of tailing waste rocks, 25 kg/m³ of activated iron tailings, 873 kg/m³ of tailing fine sand, 170 kg/m³ of water and additives (comprising 4.5 kg/m³ of polycarboxylate water reducing agent, 0.1% of cellulose ether and 2% of dextrin by mass of polycarboxylate water reducing agent). The 3 d compressive strength of the concrete is 21 MPa, the 7 d compressive strength of the concrete is 33 MPa, the 28 d compressive strength of the concrete is 41.5 MPa, and the anti-permeability grade of the concrete is P7; and The laminated slab is prepared from the concrete of the raw materials, the size of the laminated slab and the size of the grooves are the same as those in the second embodiment, the preparation method of the laminated slab is the same as that in the second embodiment, and the bonding surface of the obtained laminated slab is high in bonding capacity and good in integrity.

Embodiment IV

Other conditions are consistent with that in the second embodiment, and only the raw materials of the concrete are changed: 350 kg/m³ of cement, 35 kg/m³ of first-grade fly ash, 930 kg/m³ of tailing waste rocks, 30 kg/m³ of activated iron tailings, 880 kg/m³ of tailing fine sand, 160 kg/m³ of water and additives (comprising 3.5 kg/m³ of polycarboxylate water reducing agent, 0.2% of cellulose ether and 1% of dextrin by mass of polycarboxylate water reducing agent). The 3 d compressive strength of the concrete is 22 MPa, the 7 d compressive strength of the concrete is 34.5 MPa, the 28 d compressive strength of the concrete is 42 MPa, and the anti-permeability grade of the concrete is P8.

The laminated slab is prepared from the concrete of the raw materials, the size of the laminated slab and the size of the grooves are the same as those in the second embodiment, the preparation method of the laminated slab is the same as that in the second embodiment, and the bonding surface of the obtained laminated slab is high in bonding capacity and good in integrity.

The foregoing descriptions are merely example implementations of the present disclosure. It should be noted that a person of ordinary skill in the art may make several improvements or polishing without departing from the principle of the present disclosure and the improvements or polishing shall fall within the protection scope of the present disclosure.

What is claimed is:

1. A method for preparation of a solid waste large-mixing-amount concrete prefabricated laminated slab, comprising:
coating an interface agent in a mold, and then binding a reinforcement cage in the mold;
pouring a solid waste large-mixing-amount concrete in the mold, vibrating the concrete, and then pressing transverse grooves and longitudinal grooves in a concrete pouring surface by using a notch mold to obtain a concrete member, wherein the solid waste large-mixing-amount concrete consists of the following raw materials: 350 to 400 kg/m³ of cement, 35 to 43 kg/m³ of fly ash, 30 to 40 kg/m³ of activated iron tailings, 930 to 950 kg/m³ of tailing waste rocks, 870 to 880 kg/m³ of tailing fine sand, 155 to 170 kg/m³ of water and 3 to 5 kg/m³ of additives;
carrying out curing and demolding in sequence on the concrete member to obtain a prefabricated layer; and
casting a laminated layer on the face, provided with the grooves, of the prefabricated layer in situ to obtain the solid waste large-mixing-amount concrete prefabricated laminated slab, wherein a concrete for casting the laminated layer is the solid waste large-mixing-amount concrete;
wherein the activated iron tailings are prepared through the following method that the iron tailings are sequentially subjected to mechanical activation and thermal activation, the time of mechanical activation is 1-1.5 hours, the temperature of thermal activation is 600-800° C., and the time of thermal activation is 20-30 min; and
the additives consist of the following components: a water reducing agent, cellulose ether and dextrin; and the mass of the cellulose ether is 0.1-0.2% of the mass of the water reducing agent, and the mass of the dextrin is 1-2% of the mass of the water reducing agent.

2. The method according to claim 1, wherein the fly ash is first-grade fly ash; the tailing waste rocks are continuously graded by 5-25 mm; the fineness modulus of the tailing fine sand is 2.1-2.2; and the average particle diameter of the activated iron tailings is 10 μm or less.

3. The method according to claim 1, wherein the notch widths of grooves in the transverse grooves and the longitudinal grooves are 40-60 mm, and the depths of the grooves are 10-15 mm.

4. The method according to claim 1, wherein the thickness of the prefabricated layer is 60-70 mm, and the thickness of the laminated layer is 60-70 mm.

5. The method according to claim 3, wherein the thickness of the prefabricated layer is 60-70 mm, and the thickness of the laminated layer is 60-70 mm.

6. The method according to claim 1, further comprising the step of installing embedded parts in the mold according to design requirements after the reinforcement cage is bound.

7. The method according to claim 2, further comprising the step of installing embedded parts in the mold according to design requirements after the reinforcement cage is bound.

8. The method according to claim 1, wherein the curing method is natural curing or steam curing.

9. The method according to claim 1, further comprising the step of flushing a demolded prefabricated slab until the surface roughness of the prefabricated layer reaches more than 4 mm after demolding.

* * * * *